United States Patent [19]

Bahr et al.

[11] Patent Number: 5,531,814
[45] Date of Patent: Jul. 2, 1996

[54] SELF-LEVELING SILICONE POLISH

[75] Inventors: Bradley C. Bahr; David B. Selley, both of Midland, Mich.

[73] Assignee: Dow Corning Corporation, Midland, Mich.

[21] Appl. No.: 429,256

[22] Filed: Apr. 25, 1995

[51] Int. Cl.$^6$ .................................................. C09G 1/16
[52] U.S. Cl. .......................... 106/3; 106/11; 106/287.13; 106/287.14; 106/287.15; 556/424; 556/446; 556/465; 528/34; 528/38; 525/477; 524/773; 524/863; 524/864; 524/763
[58] Field of Search ................ 106/11, 3, 287.14, 106/287.13, 287.15; 524/773, 863, 864, 763; 528/34, 38; 525/477; 556/424, 446, 465

[56] References Cited

U.S. PATENT DOCUMENTS

| | | | |
|---|---|---|---|
| 4,218,250 | 8/1980 | Kasprzak | 106/3 |
| 4,462,828 | 7/1984 | Otsuki | 106/3 |
| 4,665,116 | 5/1987 | Kornhaber | 524/268 |
| 5,261,951 | 11/1993 | Sejpka | 106/3 |
| 5,387,417 | 2/1995 | Rentsch | 424/401 |

*Primary Examiner*—Melissa Bonner
*Attorney, Agent, or Firm*—James L. DeCesare

[57] ABSTRACT

Hard surfaces are polished by applying an abrasive free, preferably clear, composition formed from an aqueous phase and a silicone phase. The aqueous phase contains water and a water soluble hydrophilic organic solvent. The silicone phase contains a volatile methyl siloxane, a siloxane polyether, and an organosilicon resin.

14 Claims, No Drawings

SELF-LEVELING SILICONE POLISH

BACKGROUND OF THE INVENTION

This invention is directed to a polish for hard surfaces in which silicones are the major polish constituent.

Silicones are universally accepted as essential components in most types of polishes. The advantages gained by their incorporation are considerable, among which are ease of application of the polish, high gloss, reduced tendency to smear, dirt and stain resistance, excellent water repellency, and oxidation resistance.

Silicones act as a lubricant and enable effortless spreading of even the hardest film forming waxes, without softening the wax, or increasing its tendency to smear. The release properties of the silicone prevent dirt from adhering to the polished surface, and the excellent water repellent properties of the silicone are conferred to the polish. Added to all of these advantages is oxidation resistance, which ensures long lasting properties and chemical inertness.

According to the present invention, there is now provided an improved silicone polish, which is water based polish, and which does not contain any abrasive cleaning agent. It can be applied to a finish by simple hand wiping, and it "levels" out to a homogeneous film, which enhances the appearance and feel of the finish. This is unique in the sense that after application, no further rubbing, cleaning, or buffing, is necessary. The uniqueness is twofold. First, the polish is essentially one-step. Second, by not using an abrasive and by matching refractive indices of separate aqueous and silicone phases, a clear product can be made.

Traditionally, the steps in polishing an automobile have been (1) wash the car, (2) dry the car, (3) apply the polish, (4) allow the polish to dry, (5) buff the polish, and (6) remove residue in the cracks. In contrast, the steps in using the polish of this invention are simply (1) wash the car, and (2) apply the polish. Drying the car is optional, as the polish works on a wet car. When the polish dries, it requires no further effort such as wiping or buffing. When applied in the form of a clear gel to an automotive surface, the polish provides an enhanced polished appearance and feel in essentially one step.

In the past, polishes have required an abrasive to level the film when it's being applied and during buffing. If the abrasive is eliminated, the result has been a smeary or streaked appearance on the surface, requiring a significant amount of extra buffing or rubbing to remove. The self "leveling" benefit of the invention is achieved by incorporating a water soluble hydrophilic organic solvent into the water phase of the polish. The presence of the water soluble hydrophilic organic solvent enables one to match the refractive index of the aqueous phase, with the refractive index of the silicone phase, yielding a clear product, and thereby eliminating a smeary or streaked appearance. By "leveling" is meant the property of a polish to form a uniform smooth surface, its ability to cover a surface easily, and its ability to hold to the surface once applied without sagging or running.

An additional benefit of the polish of the invention is that it enables one to use greater amounts of resinous film formers, which affects the durability of the polish. In traditional polishes, resinous film formers are not desirable because they make buffing unacceptably difficult. But since there is no separate buffing step needed when using the polishes of the invention, film formers constituting resins and blends of resins are now more acceptable.

These polishes can be used for automotive applications, and for almost any hard surface found around the home or garage. Since the polish is free of common abrasives such as aluminum silicate, diatomaceous earth, silica, pumice, and Tripoli, hard surfaces can now be treated that previously were not practical with traditional polishes.

SUMMARY OF THE INVENTION

Therefore, the object of the invention is to polish a hard surface by applying an abrasive free, preferably clear, composition formed from an aqueous phase and a silicone phase. To make clear products, these phases have refractive indices matched within 0.002 of one another. The aqueous phase contains water and a water soluble hydrophilic organic solvent. The silicone phase contains a volatile methyl siloxane (VMS), a siloxane polyether, and an organosilicon resin. The presence of other siloxane-type film forming compounds is optional.

Other objects and features of the invention will become apparent from a consideration of the detailed description.

DETAILED DESCRIPTION OF THE INVENTION

The hard surface polish of the invention consists of an aqueous phase containing water and a water soluble hydrophilic organic solvent; and a silicone phase containing a volatile methyl siloxane, a siloxane polyether, and an organosilicon resin. Preferably, the aqueous phase contains 20–80% by weight of water, and 10–55% by weight of the water soluble hydrophilic organic solvent. These two components in the aqueous phase cannot both be used at their lower level, however. The silicone phase preferably contains 12.2–28.5% by weight of the volatile methyl siloxane, 0.8–1.5% by weight of the siloxane polyether, and 1–10% by weight of the organosilicon resin.

Liquid, gel, and semi-solid paste forms of the polish, can be formulated by using different ratios of the aqueous phase and the silicone phase. Preferably, there is employed 50–80% by weight of the aqueous phase, and 20–50% by weight of the silicone phase.

Clear polishes are obtained by matching the refractive indices of the two phases. For purposes of the invention, clarity is defined in terms of Nephelometric Turbidity Units (NTU). NTU readings less than 400 are considered clear; NTU readings greater than 400 are considered translucent; and NTU readings less than 100 are considered water clear. Measurements are made by preparing samples in one-half ounce glass vials which fit an Orbeco-Hellige Series 965 Digital Direct-Reading Turbidimeter. The polish is prepared and cast into the sample cell, allowed to set overnight, and measured on the turbidimeter, by inserting the cell into the sample well, and recording the reading. The measurements in Nephelometric Turbidity Units (NTU) are taken in an NTU range of 000–999, and calibrated daily. Refractive Indices (RI) are measured in a Bausch & Lomb Refractometer at 21° C. Indices within 0.002 RI units of one another are considered "matched".

The polish can be applied to many types of painted or unpainted hard surfaces made of metal, glass, plastic, or FORMICA®. Representative hard surfaces are painted automobile surfaces and parts, chrome automobile surfaces and parts such as bumpers and grills, windows, furniture, floors, indoor and outdoor siding and paneling, counter tops, appliances, toilet bowls, sinks, bathtubs, showers, drain boards, containers, trays, metal parts, and metal plates.

The water soluble hydrophilic organic solvent used in the aqueous phase is a polyhydric alcohol or glycol ether. Representative solvents are polyhydric alcohols such as ethylene glycol, propylene glycol, and trimethylene glycol; and glycol ethers such as ethylene glycol n-butyl ether, ethylene glycol phenyl ether, diethylene glycol methyl ether, diethylene glycol n-butyl ether, propylene glycol methyl ether, propylene glycol n-propyl ether, propylene glycol n-butyl ether, propylene glycol phenyl ether, dipropylene glycol methyl ether, dipropylene glycol n-propyl ether, dipropylene glycol n-butyl ether, triethylene glycol methyl ether, triethylene glycol n-butyl ether, tripropylene glycol methyl ether, and tripropylene glycol n-butyl ether. The glycol ethers are sold by The Dow Chemical Company, Midland, Mich., under their trademark DOWANOL®.

The volatile methyl siloxane in the silicone phase is a low viscosity silicone fluid with an average unit formula $(CH_3)_aSiO_{(4-a)/2}$ in which a has an average value of two or three. The fluid contains siloxane units joined by $\equiv Si-O-Si\equiv$ bonds. Representative units are monofunctional "M" units $(CH_3)_3SiO_{1/2}$ difunctional "D" units $(CH_3)_2SiO_{2/2}$. The presence of trifunctional "T" units $CH_3SiO_{3/2}$ result in the formation of branched cyclic volatile methyl siloxanes. The presence of tetrafunctional "Q" units $SiO_{4/2}$ result in the formation of branched linear volatile methyl siloxanes.

Cyclic VMS can be represented by the formula $\{(CH_3)_2SiO\}_x$, and linear VMS by the formula $(CH_3)_3SiO\{(CH_3)_2SiO\}_ySi(CH_3)_3$, in which x is 3-6, and y is 0-5. Most preferably, the volatile methyl siloxane has a boiling point less than 250° C., and a viscosity of 0.65-5.0 centistokes (mm²/s).

Some representative volatile methyl siloxanes are:

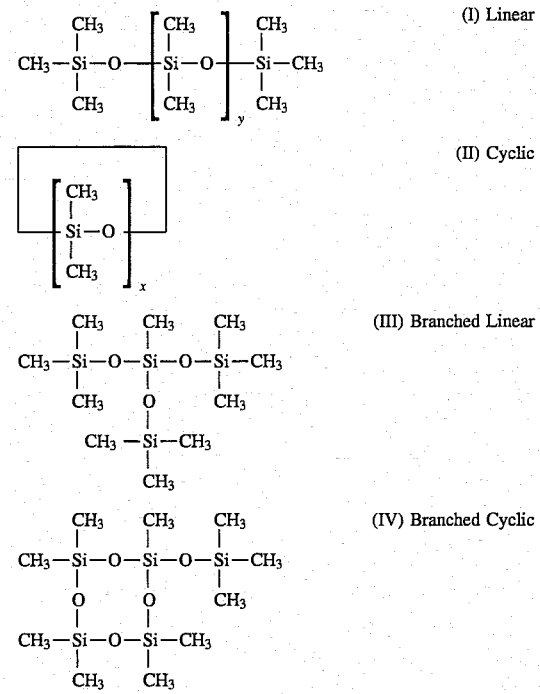

Cyclic volatile methyl siloxane (II) have been assigned the International Nomenclature Cosmetic Ingredient (INCI) name "CYCLOMETHICONE" by The Cosmetics, Toiletries and Fragrance Association, Inc., (CTFA) Washington, D.C. Cyclic and linear methyl siloxanes are clear fluids, essentially odorless, non-toxic, non-greasy, and non-stinging. VMS leave substantially no residue after thirty minutes at room temperature, when one gram of VMS fluid is placed at the center of No. 1 circular filter paper of 185 millimeters diameter, supported at its perimeter in open room atmosphere. Volatile methyl siloxanes may be used alone or mixed together. Mixtures result in solutions having evaporating behaviors different from individual fluids.

Representative linear volatile methyl siloxanes (I) are hexamethyldisiloxane (MM) with a boiling point of 100° C., viscosity of 0.65 mm²/s, and formula $Me_3SiOSiMe_3$; octamethyltrisiloxane (MDM) with a boiling point of 152° C., viscosity of 1.04 mm²/s, and formula $Me_3SiOMe_2SiOSiMe_3$; decamethyltetrasiloxane (MD$_2$M) with a boiling point of 194° C., viscosity of 1.53 mm²/s, and formula $Me_3SiO(Me_2SiO)_2SiMe_3$; dodecamethylpentasiloxane (MD$_3$M) with a boiling point of 229° C., viscosity of 2.06 mm²/s, and formula $Me_3SiO(Me_2SiO)_3SiMe_3$; tetradecamethylhexasiloxane (MD4M) with a boiling point of 245° C., viscosity of 2.63 mm²/s, and formula $Me_3SiO(Me_2SiO)_4SiMe_3$; and hexadecamethylheptasiloxane (MD$_5$M) with a boiling point of 270° C., viscosity of 3.24 mm²/s, and formula $Me_3SiO(Me_2SiO)_5SiMe_3$.

Representative cyclic volatile methyl siloxanes (II) are hexamethylcyclotrisiloxane (D$_3$) a solid with a boiling point of 134° C. and formula $\{(Me_2)SiO\}_3$; octamethylcyclotetrasiloxane (D$_4$) with a boiling point of 176° C., viscosity of 2.3 mm²/s, and formula $\{(Me_2)SiO\}_4$; decamethylcyclopentasiloxane (D$_5$) with a boiling point of 210° C., viscosity 3.87 mm²/s, and formula $\{(Me_2)SiO\}_5$; and dodecamethylcyclohexasiloxane (D$_6$) with a boiling point of 245° C., viscosity of 6.62 mm²/s, and formula $\{(Me_2)SiO\}_6$.

Representative branched volatile methyl siloxanes (III and IV) are heptamethyl-3-{(trimethylsilyl)oxy}trisiloxane (M$_3$T) with a boiling point of 192° C., viscosity of 1.57 mm²/s, and formula $C_{10}H_{30}O_3Si_4$; hexamethyl-3,3, bis{(trimethylsilyl)oxy}trisiloxane (M$_4$Q) with a boiling point of 222° C., viscosity of 2.86 mm²/s, and formula $C_{12}H_{36}O_4Si_5$; and pentamethyl{(trimethylsilyl)oxy}cyclotrisiloxane (MD$_3$) with the formula $C_8H_{24}O_4Si_4$.

One advantage of volatile methyl siloxanes as a solvent is that they are acceptable substitutes in America. The Environmental Protection Agency (EPA) has determined that volatile methyl siloxanes such as hexamethyldisiloxane, octamethyltrisiloxane, decamethyltetrasiloxane, octamethyl cyclotetrasiloxane, decamethylcyclopentasiloxane, and dodecamethylcyclohexasiloxane, are substitutes for chlorofluorocarbon CFC-113 ($C_2Cl_3F_3$) and methyl chloroform (MCF). This determination is limited to closed systems, in metal cleaning, electronic cleaning, and precision cleaning applications, under EPA's Significant New Alternatives Policy (SNAP).

An additional advantage is that EPA has excluded VMS as a volatile organic compound (VOC). EPA added VMS to a list of compounds in 40 CFR 51.100(s) excluded from the definition of VOC, on the basis that VMS have negligible contribution to tropospheric ozone formation. Compounds under the designation VMS according to EPA's exemption are cyclic, branched, or linear, "completely methylated" siloxanes. As defined, "completely methylated" means methyl groups and no other functional groups are attached to the central backbone of the siloxane.

The siloxane polyether in the silicone phase is a compound with the formula:

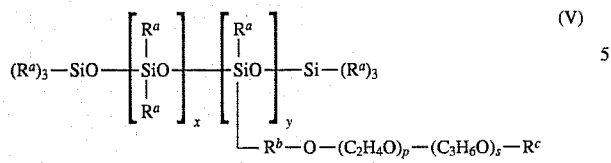

$R^a$ is an alkyl group of 1-6 carbon atoms $R^b$ is the radical —$C_mH_{2m}$—. $R^c$ a terminating radical such as hydrogen, an alkyl group of 1-6 carbon atoms, or an aryl group such as phenyl. m has a value of 2-8. p and s have values such that the oxyalkylene segment —$(C_2H_4O)_p$—$(C_3H_6O)_s$— has a molecular weight of 400-5,000. The segment preferably has 50-99 mole percent oxyethylene units —$(C_2H_4O)_p$— and 1-50 mole percent oxypropylene units —$(C_3H_6O)_s$—. x is 80-120 and y is 2-10. Preferably, $R^a$ and $R^c$ are methyl; m is 3 or 4 whereby $R^b$ is —$(CH_2)_3$—; and p and s provide a molecular weight of oxyalkylene segment —$(C_2H_4O)_p$—$(C_3H_6O)_s$— of 1,000-3,000. Most preferably, p and s are 18-28.

The organosilicon resin in the silicone phase can be a single resin or a mixture of different resins. Generically, it is an organosilicon resinous copolymer which includes $SiO_{4/2}$ units with one or more units selected from the group consisting of $R_3SiO_{1/2}$ units, $R_2SiO_{2/2}$ units, and $RSiO_{3/2}$ units, in a molar ratio such that the number average molecular weight of the resinous copolymer is 1,200-10,000. R is a hydrocarbon group such as alkyl radicals with 1-6 carbon atoms; aryl radicals such as phenyl, tolyl, and xylyl; alkenyl radicals such as vinyl and allyl; and trifluoropropyl radicals. The resin can be used alone or mixed with 1-60% by weight of a linear or branched siloxane fluid of the formula $R_3SiO(R_2SiO)_nSiR_3$ in which R has the meaning defined above. n is 1-100,000, which includes siloxane fluids with viscosities up to 2,500,000 centistokes (mm²/s). For example, a value of 500 for n, provides a fluid with a viscosity of 10,000 mm²/s. The fluid should have a molecular weight sufficient to be non-volatile by stripping. Following are examples of some organosilicon resins which can be used.

A "first" suitable organosilicon resin is a benzene soluble resin copolymer of triorganosiloxy units $R_3SiO_{1/2}$ and $SiO_{4/2}$ units in the mole ratio of 0.7 moles of triorganosiloxy units per mole of $SiO_{4/2}$ units. R has the meaning defined above. This resin has a number average molecular weight of 5,000 based on gel permeation chromatography using silicate resin standards. The triorganosiloxy units are trimethylsiloxy units and dimethylvinylsiloxy units, and it includes 1.4-2.2 weight percent silicon bonded vinyl radicals. If desired, the resin may be mixed with a silicone fluid having a molecular weight sufficient to be non-volatile by stripping. Examples of suitable silicones are polydimethylsiloxane fluids with viscosities of 100-60,000 mm²/s at 25° C.

A "second" suitable organosilicon resin is a benzene soluble resin copolymer of triorganosiloxy units and $SiO_{4/2}$ units in the mole ratio of 0.7 moles of triorganosiloxy units per mole of $SiO_{4/2}$ units with a number average molecular weight of 5,000. The triorganosiloxy units are trimethylsiloxy units and dimethylvinylsiloxy units, and it includes 1.8-2.25 weight percent vinyl radicals. As noted above, the resin may be mixed with a silicone fluid.

A "third" suitable organosilicon resin is a resinous copolymeric siloxane prepared by (i) forming an acidic homogenous mixture of a silanol containing resinous copolymeric siloxane with $R_3SiO_{1/2}$ units and $SiO_{4/2}$ units; an organohydrogen polysiloxane with the formula $R_mH_nSiO_{(4-m-n)/2}$ where m and n are positive integers with a sum less than four, preferably 1.9-2.1; and an organic solvent, and (ii) heating the mixture to remove substantially all of the organic solvent. R has the meaning defined above, but also including arylalkyl radicals such as betaphenylethyl and betaphenylpropyl; and cycloaliphatic radicals such as cyclopentyl, cyclohexyl, and cyclohexenyl. Again, the resin may be mixed with a silicone fluid.

A "fourth" suitable organosilicon resin is a siloxane resin copolymer including $R_3SiO_{1/2}$ units and $SiO_{4/2}$ units in a mole ratio such that the number average molecular weight is 1,200 to 10,000. Preferably, the mole ratio is 0.7:1.0, and the number average molecular weight is 5,000. R is previously defined. The resin may contain $R_2SiO_{2/2}$ units and $RSiO_{3/2}$ units. Preferably it contains 2.5 weight percent silicon bonded OH groups. The resin may be mixed with a silicone fluid.

A "fifth" suitable organosilicon resin is a siloxane resin copolymer similar to the "fourth" resin, except that its mole ratio is 0.75:1.0, and the content of silicon bonded OH groups is less than one weight percent.

An aminofunctional polysiloxane may be included as an optional component in the silicone phase. They are silicone fluids with highly polar pendant aminoalkyl modifying groups that enhance the durability of films formed by polysiloxanes, and promote adhesion of films to a variety of substrates. Particularly preferred aminofunctional polysiloxanes include reactive and nonreactive hydrolyzable and non-hydrolyzable derivatives which are wholly, or in part, terminally substituted with aminopropyl, aminobutyl, or diamino pendant chains. The aminofunctional polysiloxane has the formula:

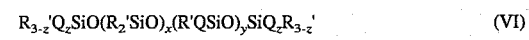

where R' is an a alkyl group of 1-4 carbons or a phenyl group, provided that at least 50 percent of the total number of R' groups are methyl. Q is an amine functional —R"Z. R" is a divalent alkylene radical of 3-6 carbon atoms, and Z is a monovalent radical such as —$NR_2'''$ or —NR''' $(CH_2)_nNR_2'''$. R''' is hydrogen or an alkyl group of 1-4 carbon atoms. n is 2-6. z is 0 or 1. x is 25-3000. y is 0-100 when z is 1 but y is 1-100 when z is 0. In all cases, y is not greater than one tenth the average value of x.

Suitable R' groups are methyl, ethyl, propyl, isopropyl, butyl, isobutyl, and phenyl, provided that at least 50% of the R' groups are methyl. Alkylene radicals R" include trimethylene, tetramethylene, pentamethylene, —$CH_2CHCH_3CH_2$—, and —$CH_2CH_2CHCH_3CH_2$—. Siloxanes where R" is trimethylene or an alkyl substituted trimethylene radical such as —$CH_2CHCH_3CH_2$— are preferred. Alkyl groups represented by R''' include methyl, ethyl, propyl, isopropyl, butyl, and isobutyl. Useful Z radicals include unsubstituted amine radicals such as —$NH_2$, alkyl substituted amine radicals such as —$NHCH_3$, —$NHCH_2CH_2CH_2CH_3$, and —$N(CH_2CH_3)_2$; and aminoalkyl substituted amine radicals such as —$NHCH_2CH_2NH_2$, —$NH(CH_2)_6NH_2$, and —$NHCH_2CH_2CH_2N(CH_3)_2$.

When z is zero, the polymer has only pendent amine functional substituents in the chain. When z is one, the polymer may have only terminal amine functional substituents, or both terminal and pendent amine functional substituents in the chain. Preferably, x varies from 25-100. y varies from 0-100 when z is one and 1-100 when z is zero. Most preferably, the sum of x+y is 50-500. Especially preferred aminofunctional polysiloxane are low viscosity fluids with viscosities of about 35 mm²/sec.

Clear polishes are obtained by matching the RI of the silicone phase with the RI of the aqueous phase. The RI's are determined with a refractometer. Because of disparity in refractive indices of water and silicone, the water soluble hydrophilic organic solvent such as propylene glycol is used. It is added to the aqueous phase to increase the RI of the aqueous phase until it matches the RI of the silicone phase.

According to this procedure, ingredients for the aqueous phase are mixed together and the RI of the aqueous phase is measured. In a separate container, ingredients for the silicone phase are mixed together and the RI of the silicone phase is measured. The refractive indices of the two phases are matched by adjusting the proportion of water and propylene glycol in the aqueous phase. More water lowers the RI of the aqueous phase. More propylene glycol increases the RI of the aqueous phase. The aqueous phase is then added to the silicone phase, and the phases are agitated.

Optional components can be added to the aqueous phase and the s il iconE phase, but not if their addition results in either phase not being transparent, or in the case of the aqueous phase, they are not soluble in that phase.

The invention is described in more detail in the following examples.

EXAMPLE I

An automotive treatment composition was prepared by combining the contents of two containers. Components 1–6 of PHASE A were added to a 1000 ml beaker and blended with a standard laboratory mixer. Components 7 and 8 of PHASE B were pre-blended in a separate container by simple agitation. Components 1–8 of PHASES A and B are shown in Table I. PHASE B was added to PHASE A slowly and with vigorous agitation. A water-in-oil polish emulsion was formed. It was clear in appearance and had a gel-like consistency.

TABLE I

| Component | Parts | Ingredient |
|---|---|---|
| PHASE A | | |
| 1 | 1 | Siloxane Polyether |
| 2 | 5 | "Fourth" Organosilicon Resin |
| 3 | 0.25 | Aminofunctional Polysiloxane |
| 4 | 0.4 | Polydimethylsiloxane Fluid 60,000 cs (mm²/s) |
| 5 | 0.25 | "Third" Organosilicon Resin |
| 6 | 13.1 | Mixture of $D_4$, $D_5$, and $D_6$ |
| PHASE B | | |
| 7 | 28 | Water |
| 8 | 52 | Propylene Glycol |

The aminofunctional polysiloxane in PHASE A had a degree of polymerization (number of repeating x+y units) of 100, and a viscosity of 35 centistokes (mm²/sec). The oxyalkylene segment of the siloxane polyether in PHASE A had a molecular weight of 2500 and contained oxyethylene and oxypropylene units. The siloxane polyether had a degree of polymerization 400, and a viscosity of 1,000 centistokes (mm²/sec). The "Third" and "Fourth" Resins in PHASE A correspond to the organosilicon resinous copolymers described above. Refractive Indices of PHASES A and B matched to within 0.002.

EXAMPLE II

The treatment composition in Example I was applied with a damp cotton rag to one portion of a 12"×18" (30×46 cm) cleaned, dark blue, clear-coated automotive paint panel. The treated portion of the panel was allowed to dry for one hour. Other portions of the panel were left untreated for comparison. After the treated portion had dried, it had an improved appearance, and a smooth slick feel without rubbing or buffing, compared to untreated portions of panel.

EXAMPLE III

Example I was repeated but the treatment composition contained the ingredients shown in Table II.

TABLE II

| Component | Parts | Ingredient |
|---|---|---|
| PHASE A | | |
| 1 | 1 | Siloxane Polyether |
| 2 | 2 | "Fourth" Organosilicon Resin |
| 3 | 17 | Mixture of $D_4$, $D_5$, and $D_6$ |
| PHASE B | | |
| 4 | 30 | Water |
| 5 | 50 | Propylene Glycol |

EXAMPLE IV

The treatment composition in Example III was applied with a damp rag to one portion of the hood and roof of a dark green late model General Motors automobile. The treated portions were allowed to dry. Other portions of the hood and roof were left untreated for comparison. After the treated portion had dried, it had an improved appearance with a deeper color; and the feel was slicker and more slippery, compared to untreated portions of the hood and roof. There were no unacceptable defects in the polished appearance of the treated portion.

EXAMPLE V

Examples III and IV were repeated except that PHASE B contained 80 parts of water, instead of 30 parts of water and 50 parts of propylene glycol. The refractive indices of the two phases did not match. After the treated portion had dried, it showed a streaked, flawed appearance, although it had a slick feel. This is in comparison to the treatment composition in Example IV in which there were no unacceptable defects in the polished appearance of the treated portion.

EXAMPLE VI

Example I was repeated except that the polish had the composition shown in Table III. Refractive Indices of PHASES A and B matched to within 0.002. Turbidity was measured using an Orbeco-Hellige Digital Direct-Reading Turbidimeter and determined to be 225 NTU. Consistency and appearance was that of a clear gel.

TABLE III

| Component | Parts | Ingredient |
|---|---|---|
| PHASE A | | |
| 1 | 1 | Siloxane Polyether |
| 2 | 3 | "Fourth" Organosilicon Resin |
| 3 | 0.3 | Aminofunctional Polysiloxane |
| 4 | 0.2 | Polydimethylsiloxane Fluid 60,000 cs (mm²/s) |
| 5 | 0.2 | "Third" Organosilicon Resin |
| 6 | 15.3 | Mixture of $D_4$, $D_5$, and $D_6$ |

TABLE III-continued

| Component | Parts | Ingredient |
|---|---|---|
| | | PHASE B |
| 7 | 28 | Water |
| 8 | 52 | Propylene Glycol |

EXAMPLE VII

The treatment composition prepared in Example VI was applied to the trunk lid of a dark green, late model General Motors automobile, with a damp rag using a simple wiping motion. After drying, it was observed that the treated portion had improved appearance and feel, as compared to an untreated portion of the same panel. The treated portion had no unacceptable defects in the polished appearance.

EXAMPLE VIII

Example III was repeated but the treatment composition contained the ingredients shown in Table IV. The refractive indices of the two phases did not match. Turbidity was measured using an Orbeco-Hellige Digital Direct-Reading Turbidimeter and determined to be 730 NTU. Consistency and appearance was that of a translucent gel.

TABLE IV

| Component | Parts | Ingredient |
|---|---|---|
| | | PHASE A |
| 1 | 1 | Siloxane Polyether |
| 2 | 2 | "Fourth" Organosilicon Resin |
| 3 | 17 | Mixture of $D_4$, $D_5$, and $D_6$ |
| | | PHASE B |
| 4 | 50 | Water |
| 5 | 30 | Propylene Glycol |

EXAMPLE IX

Example VIII was repeated but the treatment composition contained the ingredients shown in Table V. Refractive Indices of PHASES A and B matched to within 0.002. Turbidity was measured using an Orbeco-Hellige Digital Direct-Reading Turbidimeter and determined to be 25 NTU. Consistency and appearance was that of a water-clear gel.

TABLE V

| Component | Parts | Ingredient |
|---|---|---|
| | | PHASE A |
| 1 | 1 | Siloxane Polyether |
| 2 | 2 | "Fourth" Organosilicon Resin |
| 3 | 17 | Mixture of $D_4$, $D_5$, and $D_6$ |
| | | PHASE B |
| 4 | 32.9 | Water |
| 5 | 47.1 | Diethylene Glycol n-Butyl Ether (DOWANOL® DB) |

EXAMPLE X

The treatment compositions in Examples VIII and IX were evaluated by applying both polishes to a 12"×18" (30×46 cm) cleaned, dark blue, clear-coated paint panel. The polishes were applied by spreading a small dab of each material over the portion receiving treatment using a damp piece of cotton "terry cloth". The panel was divided into three sections, with two sections being treated, and the third section remaining as an untreated control. The three sections were separated by masking tape. The treatments were allowed to dry thoroughly and then evaluated.

The portion treated with the translucent gel in Example VIII was observed to be improved in appearance compared to the untreated control. It had a deeper color and less obvious surface defects and scratches. The treated portion also had a much smoother, slicker feel.

The portion treated with the water-clear gel in Example IX was observed to be improved in appearance compared to the untreated control. It had a deeper color, even more so than the portion treated with the composition in Example VIII. It had less obvious surface defects or scratches. The portion treated with the water-clear gel in Example IX had a much smoother, slicker feel than the untreated portion. It had a more noticeable slicker feel than the portion treated with the translucent gel in Example VIII.

While the translucent gel in Example VIII is an effective polish and provides acceptable performance, Example X shows that additional advantages can be obtained by using clear polishes, such as the water-clear gel in Example IX.

Other variations and modifications may be made in compounds, compositions, and methods described without departing from essential features of the invention. The forms of the invention are only exemplary and not intended as limitations on the scope of the invention defined in the claims.

That which is claimed is:

1. A method of polishing a hard surface comprising applying to the hard surface an abrasive free composition formed from an aqueous phase and a silicone phase; the phases having refractive indices within 0.002 of one another; the aqueous phase containing water and a water soluble hydrophilic organic solvent; the silicone phase containing a volatile methyl siloxane, a siloxane polyether, and an organosilicon resin; the water soluble hydrophilic organic solvent being selected from the group consisting of ethylene glycol, propylene glycol, trimethylene glycol, ethylene glycol n-butyl ether, ethylene glycol phenyl ether, diethylene glycol methyl ether, diethylene glycol n-butyl ether, propylene glycol methyl ether, propylene glycol n-propyl ether, propylene glycol n-butyl ether, propylene glycol phenyl ether, dipropylene glycol methyl ether, dipropylene glycol n-propyl ether, dipropylene glycol n-butyl ether, triethylene glycol methyl ether, triethylene glycol n-butyl ether, tripropylene glycol methyl ether, and tripropylene glycol n-butyl ether.

2. A method according to claim 1 in which the volatile methyl siloxane has the formula $\{(CH_3)_2SiO\}_x$ or $(CH_3)_3SiO\{(CH_3)_2SiO\}_ySi(CH_3)_3$ where x is 3–6, y is 0–5, and the volatile methyl siloxane has a boiling point less than 250° C. and a viscosity of 0.65–5.0 centistokes (mm$^2$/s).

3. A method according to claim 1 in which the siloxane polyether has the formula:

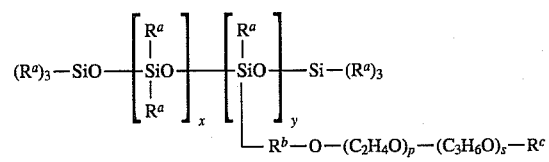

where $R^a$ is an alkyl group of 1–6 carbon atoms; $R^b$ is $-C_mH_{2m}-$; $R^c$ is hydrogen, an alkyl group of 1–6 carbon atoms, or an aryl group; m is 2–8; p and s have values such that the oxyalkylene segment —(C$_2$H$_4$O)$_p$—(C$_3$H$_6$O)$_s$— has a molecular weight of 400–5,000; the segment having 50–99 mole percent oxyethylene units —(C$_2$H$_4$O)$_p$— and 1–50 mole percent oxypropylene units —(C$_3$H$_6$O)$_s$—; x is 80–120; and y is 2–10.

4. A method according to claim 1 in which the organosilicon resin is a copolymer containing SiO$_{4/2}$ units and one or more units selected from the group consisting of R$_3$SiO$_{1/2}$ units, R$_2$SiO$_{2/2}$ units, and RSiO$_{3/2}$ units, in a molar ratio such that its number average molecular weight is 1,200–10,000, and R is selected from the group consisting of alkyl radicals of 1–6 carbon atoms, aryl radicals, alkenyl radicals, and trifluoropropyl radicals.

5. A method according to claim 1 in which the organosilicon resin is mixed with a siloxane polymer of the formula R$_3$SiO(R$_2$SiO)$_n$SiR$_3$ where R is an alkyl radical of 1–6 carbon atoms, an aryl radical, an alkenyl radical, or a trifluoropropyl radical; and n is 1–100,000.

6. A method according to claim 4 in which the organosilicon resin is selected from the group consisting of:

(i) a benzene soluble resin copolymer of triorganosiloxy units R$_3$SiO$_{1/2}$ and SiO$_{4/2}$ units in the mole ratio of about 0.7 moles of triorganosiloxy units per mole of SiO$_{4/2}$ units, the resin having a number average molecular weight of about 5,000, the resin copolymer including 1.4–2.2 weight percent of silicon bonded vinyl radicals;

(ii) a benzene soluble resin copolymer of triorganosiloxy units and SiO$_{4/2}$ units in the mole ratio of about 0.7 moles of triorganosiloxy units per mole of SiO$_{4/2}$ units, and a number average molecular weight of about 5,000, the resin copolymer including 1.8–2.25 weight percent vinyl radicals;

(iii) a resinous copolymeric siloxane composition prepared by (a) forming an acidic homogenous mixture of a silanol containing resinous copolymeric siloxane with R$_3$SiO$_{1/2}$ units and SiO$_{4/2}$ units; an organohydrogen polysiloxane of the formula R$_m$H$_n$SiO$_{(4-m-n)/2}$ where m and n are positive integers with a sum less than four; and an organic solvent, and (b) heating the mixture to remove substantially all of the organic solvent; and (iv) a siloxane resin copolymer including R$_3$SiO$_{1/2}$ units and SiO$_{4/2}$ units in a mole ratio such that the number average molecular weight is between 1,200–10,000.

7. A polish for hard surfaces comprising an abrasive free composition formed from an aqueous phase and a silicone phase; the phases having refractive indices with 0.002 of one another; the aqueous phase containing water and a water soluble hydrophilic organic solvent selected from the group consisting of a polyhydric alcohol and glycol ether; the silicon phase containing a volatile methyl siloxane, a siloxane polyether, and an organosilicon resin; the organosilicon resin being a copolymer including SiO$_{4/2}$ units and one or more units selected from the group consisting of R$_3$SiO$_{1/2}$ units, R$_2$SiO$_{2/2}$ units, and RSiO$_{3/2}$ units, in a molar ratio such that the number average molecular weight of the resin copolymer is 1,200–10,000, and R is selected from the group consisting of alkyl radicals of 1–6 carbon atoms, aryl radicals, alkenyl radicals, and trifluoropropyl radicals.

8. A polish according to claim 7 in which the water soluble hydrophilic organic solvent is selected from the group consisting of ethylene glycol, propylene glycol, trimethylene glycol, ethylene glycol n-butyl ether, ethylene glycol phenyl ether, diethylene glycol methyl ether, diethylene glycol n-butyl ether, propylene glycol methyl ether, propylene glycol n-propyl ether, propylene glycol n-butyl ether, propylene glycol phenyl ether, dipropylene glycol methyl ether, dipropylene glycol n-propyl ether, dipropylene glycol n-butyl ether, triethylene glycol methyl ether, triethylene glycol n-butyl ether, tripropylene glycol methyl ether, and tripropylene glycol n-butyl ether.

9. A polish according to claim 7 in which the volatile methyl siloxane has the formula {(CH$_3$)$_2$SiO}$_x$ or (CH$_3$)$_3$SiO{(CH$_3$)$_2$SiO}$_y$Si(CH$_3$)$_3$ where x is 3–6, y is 0–5, and the volatile methyl siloxane has a boiling point less than 250° C. and a viscosity of 0.65–5.0 centistokes (mm$^2$/s).

10. A polish according to claim 7 in which the siloxane polyether has the formula:

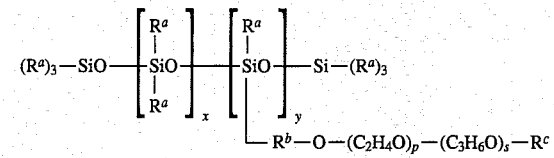

where R$^a$ is an alkyl group of 1–6 carbon atoms; R$^b$ is —C$_m$H$_{2m}$—; R$^c$ is hydrogen, an alkyl group of 1–6 carbon atoms, or an aryl group; m is 2–8; p and s have values such that the oxyalkylene segment —(C$_2$H$_4$O)$_p$—(C$_3$H$_6$O)$_s$— has a molecular weight of 400–5,000; the segment having 50–99 mole percent oxyethylene units —(C$_2$H$_4$O)$_p$— and 1–50 mole percent oxypropylene units —(C$_3$H$_6$O)$_s$—; x is 80–120; and y is 2–10.

11. A polish according to claim 7 in which the organosilicon resin is mixed with a siloxane polymer of the formula R$_3$SiO(R$_2$SiO)$_n$SiR$_3$ in which R is an alkyl radical of 1–6 carbon atoms, an aryl radical, an alkenyl radical, or a trifluoropropyl radical; and n is 1–100,000.

12. A polish according to claim 7 in which the organosilicon resin is selected from the group consisting of:

(i) a benzene soluble resin copolymer of triorganosiloxy units R$_3$SiO$_{1/2}$ and SiO$_{4/2}$ units in the mole ratio of about 0.7 moles of triorganosiloxy units per mole of SiO$_{4/2}$ units, the resin having a number average molecular weight of about 5,000, the resin copolymer including 1.4–2.2 weight percent of silicon bonded vinyl radicals;

(ii) a benzene soluble resin copolymer of triorganosiloxy units and SiO$_{4/2}$ units in the mole ratio of about 0.7 moles of triorganosiloxy units per mole of SiO$_{4/2}$ units, with a number average molecular weight of about 5,000, the resin copolymer including 1.8–2.25 weight percent vinyl radicals;

(iii) a resinous copolymeric siloxane composition prepared by (a) forming an acidic homogenous mixture of a silanol containing resinous copolymeric siloxane with R$_3$SiO$_{1/2}$ units and SiO$_{4/2}$ units; an organohydrogen polysiloxane of the formula R$_m$H$_n$SiO$_{(4-m-n)/2}$ where m and n are positive integers having a sum less than four; and an organic solvent, and (b) heating the mixture to remove substantially all of the organic solvent; and (iv) a siloxane resin copolymer including R$_3$SiO$_{1/2}$ units and SiO$_{4/2}$ units in a mole ratio such that the number average molecular weight is 1,200–10,000.

13. A polish according to claim 7 which additionally comprises an aminofunctional polysiloxane with the formula:

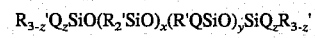

where R' is an alkyl group of 1–4 carbons or a phenyl group, provided that at least 50 percent of the total number of R' groups are methyl; Q is —R"Z; R" is a divalent alkylene radical of 3–6 carbon atoms; Z is —NR$_2$'" or —NR'"(CH$_2$)$_n$NR$_2$'"; R'" is hydrogen or an alkyl group of 1–4 carbons; n is, 2–6; z is 0 or 1; x is 25–3000; y is 0–100 when z is 1 and 1–100 when z is 0; provided y has an average value not greater than one tenth the average value of x.

14. A polish according to claim 7 in which the aqueous phase contains 20–80% by weight of water and 10–55% by weight of the water soluble hydrophilic organic solvent; the silicone phase contains 12.2–28.5% by weight of the volatile methyl siloxane, 0.8–1.5% by weight of the siloxane polyether, and 1–10% by weight of the organosilicon resin; and the polish comprises 50–80% by weight of the aqueous phase and 20–50% by weight of the silicone phase.

* * * * *